(12) United States Patent
Tisdale et al.

(10) Patent No.: US 9,481,582 B2
(45) Date of Patent: Nov. 1, 2016

(54) NANOCRYSTAL SYNTHESIS

(71) Applicants: William Tisdale, Belmont, MA (US); Ferry Prins, Barendrecht (NL); Mark Weidman, Cambridge, MA (US); Megan Beck, St. Maries, ID (US)

(72) Inventors: William Tisdale, Belmont, MA (US); Ferry Prins, Barendrecht (NL); Mark Weidman, Cambridge, MA (US); Megan Beck, St. Maries, ID (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 14/552,410

(22) Filed: Nov. 24, 2014

(65) Prior Publication Data

US 2015/0151980 A1    Jun. 4, 2015

Related U.S. Application Data

(60) Provisional application No. 61/909,445, filed on Nov. 27, 2013, provisional application No. 61/972,966, filed on Mar. 31, 2014.

(51) Int. Cl.
| | |
|---|---|
| *C01B 17/20* | (2006.01) |
| *C01B 19/04* | (2006.01) |
| *C01G 21/00* | (2006.01) |
| *H01L 21/00* | (2006.01) |
| *C01G 21/21* | (2006.01) |
| *C01B 19/00* | (2006.01) |

(52) U.S. Cl.
CPC ............ *C01G 21/21* (2013.01); *C01B 19/007* (2013.01); *C01P 2002/72* (2013.01); *C01P 2004/04* (2013.01); *C01P 2004/52* (2013.01); *C01P 2004/64* (2013.01)

(58) Field of Classification Search
CPC ... C01G 21/21; C01B 19/04; C01P 2004/64; C01P 2004/52; Y10S 438/962; Y10S 438/00; H01L 21/00
See application file for complete search history.

(56) References Cited

U.S. PATENT DOCUMENTS 7,834,468 B2 * 11/2010 Dutta .................. B82Y 30/00
257/40

* cited by examiner

*Primary Examiner* — Timothy Vanoy
(74) *Attorney, Agent, or Firm* — Steptoe & Johnson LLP

(57) ABSTRACT

A method of preparing monodisperse MX semiconductor nanocrystals can include contacting an M-containing precursor with an X donor to form a mixture, where the molar ratio between the M containing precursor and the X donor is large. Alternatively, if additional X donor is added during the reaction, a smaller ratio between the M containing precursor and the X donor can be used to prepare monodisperse MX semiconductor nanocrystals.

26 Claims, 18 Drawing Sheets

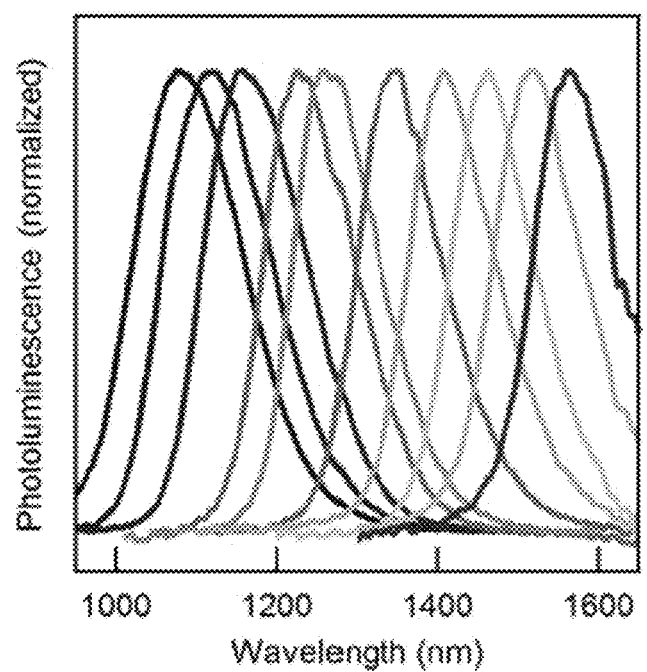
FIG. 13A
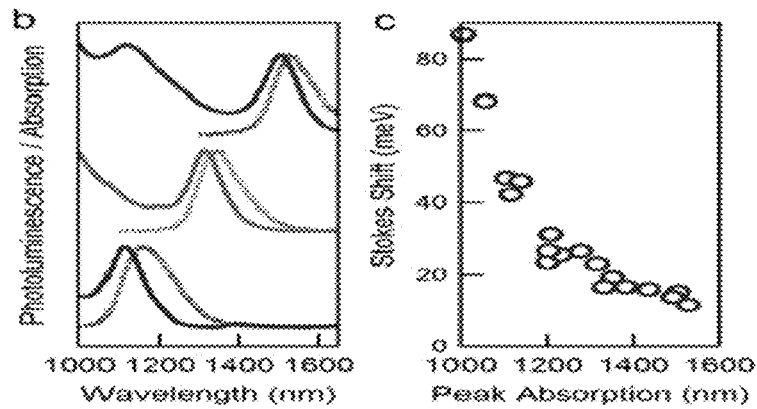
FIG. 13B FIG. 13C

US 9,481,582 B2

NANOCRYSTAL SYNTHESIS

CLAIM OF PRIORITY

This application claims the benefit of prior U.S. Provisional Application No. 61/909,445, filed on Nov. 27, 2013, and of Provisional U.S. Patent Application No. 61/972,966, filed Mar. 31, 2014, each of which is incorporated by reference in its entirety.

FEDERALLY SPONSORED RESEARCH

This invention was made with Government support under Grant No. DE-SC0010538 awarded by the U.S. Department of Energy are under Grant No. DMR-0819762 awarded by the National Science Foundation. The Government has certain rights in the invention.

FIELD OF THE INVENTION

The invention relates to nanocrystals and methods of making nanocrystals.

BACKGROUND

Nanocrystals having small dimensions can have properties intermediate between molecular and bulk forms of matter and can exhibit quantum confinement of excitons in all three dimensions. Quantum confinement leads to an increase in the effective band gap of the material with decreasing crystallite size. In most applications of nanocrystals, it is desirable to have monodisperse nanocrystals, that is, nanocrystals of nearly all the same size.

SUMMARY

In one aspect, a method of preparing semiconductor nanocrystals can include contacting an M-containing precursor with an X donor to form a mixture; and heating the mixture in the presence of a coordinating solvent to form nanocrystals, wherein the molar ratio between the M containing precursor and the X donor can be more than 15.

In certain embodiments, M can be selected from the group consisting of Cd, Pb, Zn, Mg, Hg, Al, Ga, In, and Tl. X can be selected from the group consisting of O, S, Se, Te, N, P, As, and Sb. M can be Pb. X can be S. X can be Se.

In certain embodiments, the molar ratio between the M containing precursor and the X donor can be between 20:1 and 30:1. The molar ratio between the M containing precursor and the X donor can be between 23:1 and 25:1. The molar ratio between the M containing precursor and the X donor can be 24:1.

In certain embodiments, the formed nanocrystals can be monodisperse. The dispersity of the nanocrystals can be less than 5%. The dispersity of the nanocrystals can be less than 4%. The nanocrystals can have a HWHM of less than 30 meV. The peak absorption of the nanocrystals can be between 1000 nm and 1800 nm.

In certain embodiments, the method can include heating the mixture at a temperature of less than 150° C. The method can include heating the mixture at a temperature of less than 100° C. The method can include heating the mixture at a temperature of less than 50° C.

In certain embodiments, the quantum yield of the nanocrystals can be more than 30%. The quantum yield of the nanocrystals can be more than 50%.

In certain embodiments, the method can include comprising purifying the nanocrystals. The method can include purifying the nanocrystals with alcohols. The method can include purifying the nanocrystals with oleic acid.

In another aspect, a method of preparing semiconductor nanocrystals can include contacting an M-containing precursor with an X donor to form a mixture, wherein the molar ratio between the M containing precursor and the X donor can be more than 4; heating the mixture in the presence of a coordinating solvent to form nanocrystals; and adding additional X donor to the mixture during the heating.

In certain embodiment, the dispersity of the nanocrystals can be less than 5%. The dispersity of the nanocrystals can be less than 4%.

In certain embodiments, the additional X donor can be added slowly to the mixture. The additional X donor can be added within 1-5 minutes of the initial injection. The amount of the additional X donor can be 50-100% of the initial X donor which was injected to cause the nucleation burst. The amount of the additional X donor can more than 100% of the initial X donor. The additional X donor can be added within a period of longer than 5 minutes of the initial injection. The speed of adding additional X donor can be at least as slowly as the speed of the X donor being consumed by the growing NCs.

Other aspects, embodiments, and features will be apparent from the following description, the drawings, and the claims.

Figure 8:
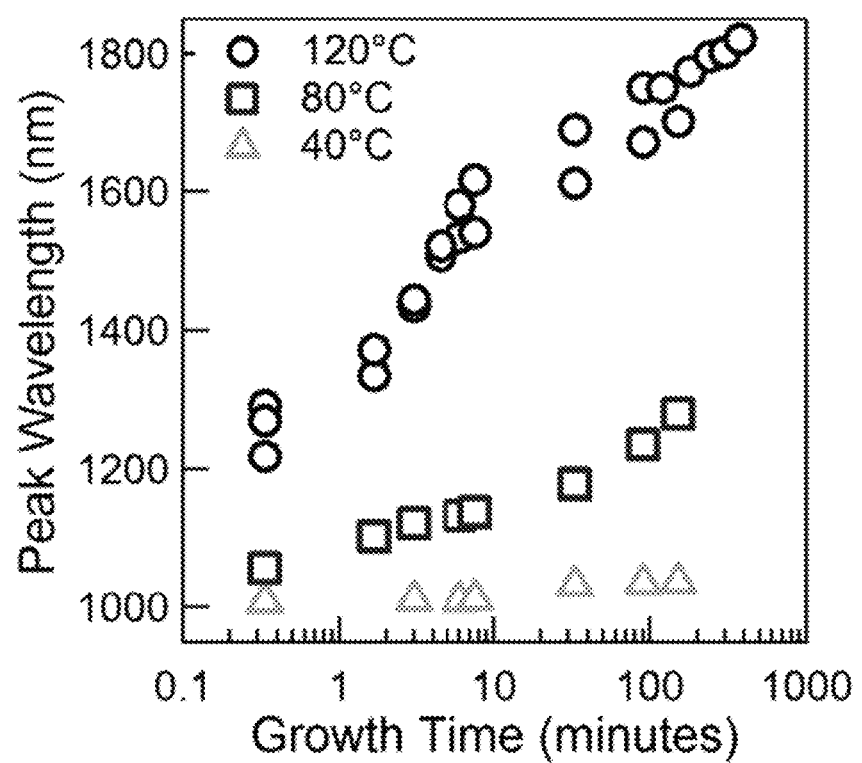

FIG. 8 shows evolution of peak wavelength values as a function of growth time in solution. All syntheses are using a 24:1 Pb:S ratio and at temperatures of 40° C., 80° C., and 120° C.

Figure 9:
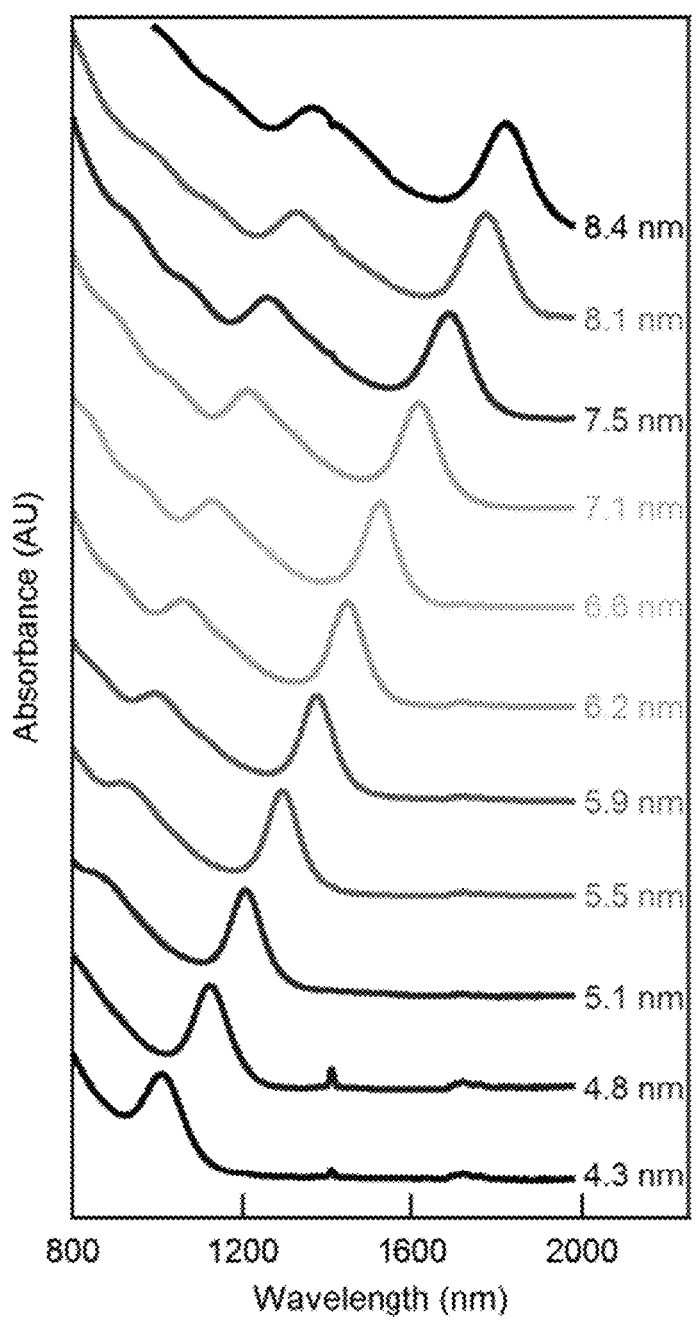

FIG. 9 shows absorption spectra using a 24:1 Pb:S ratio showing the synthetic range of 1000-1800 nm (1.25-0.70 eV). The bottom two spectra (dark violet, purple) were synthesized at 40° C. and 80° C., respectively, while all others were synthesized at 120° C. Labels indicate the average diameter of the NCs, as determined by Equation 2. Spectra are normalized to have the same peak amplitude and offset for clarity.

Figure 10:
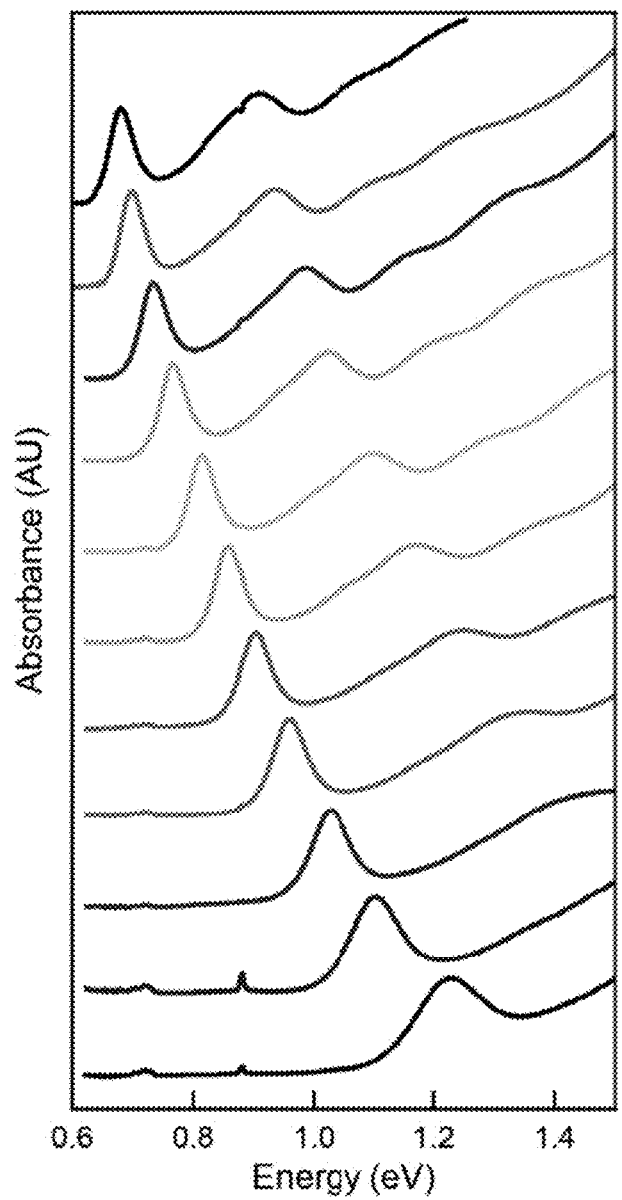

FIG. 10 shows absorption spectra of PbS NCs synthesized with a 24:1 Pb:S precursor stoichiometry. By plotting on this scale, it can be seen that the width of the first absorption peak is continuously decreasing as the NCs become larger in size. All spectra scaled to have a peak value of 1 and offset for clarity.

Figure 11:
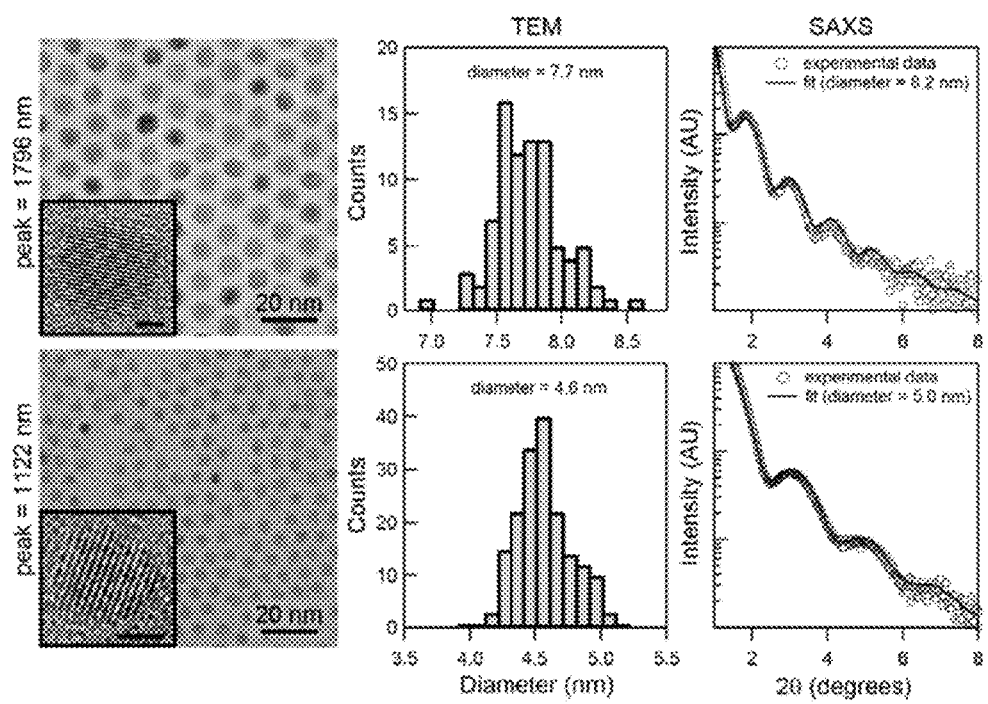

FIG. 11 shows average NC diameter by transmission electron microscopy (TEM) and small angle X-ray scattering (SAXS). Here it presents a large diameter batch (peak wavelength=1796 nm) and a small diameter batch (peak wavelength=1122 nm). The left column shows the TEM images used for analysis, with the middle column being the histograms of diameters which result. The right column is the experimentally obtain SAXS pattern and a fit to the form factor of an ideal sphere to determine the diameter. Insets to the TEM micrographs are high-resolution TEM images revealing single-crystal NCs. Scale bars are 2 nm.

Figure 12:
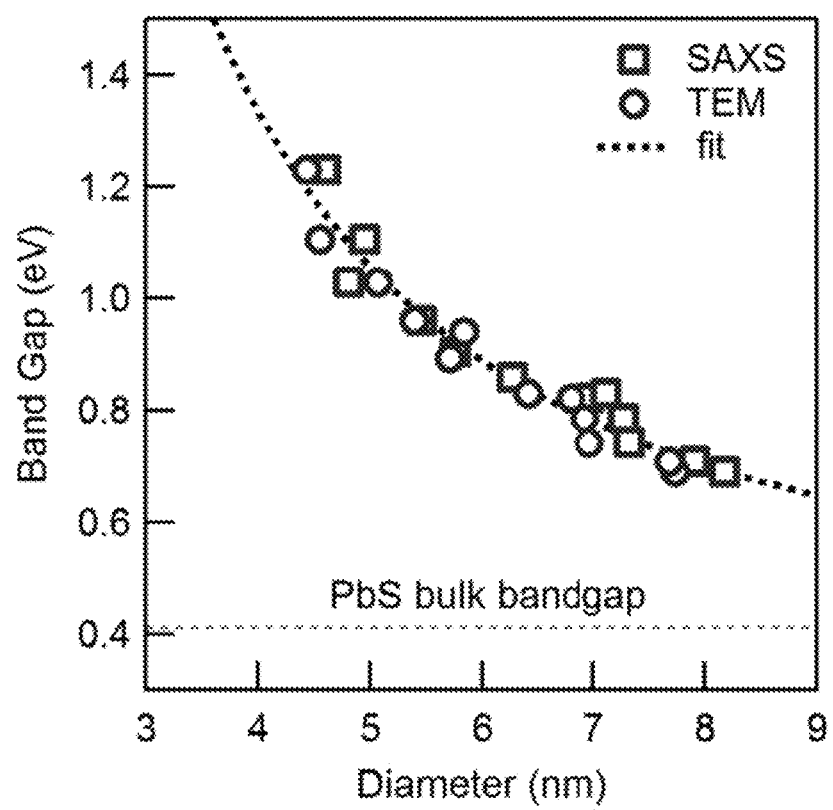

FIG. 12 shows NC band gap versus diameter, as measured by TEM and SAXS.

FIG. 13(a) shows photoluminescence spectra for NCs dispersed in TCE. FIG. 13(b) shows comparison of absorption spectra (solid lines) and photoluminescence spectra (dashed lines). FIG. 13(c) shows stokes shift plotted as a function of peak absorption wavelength.

Figure 14:
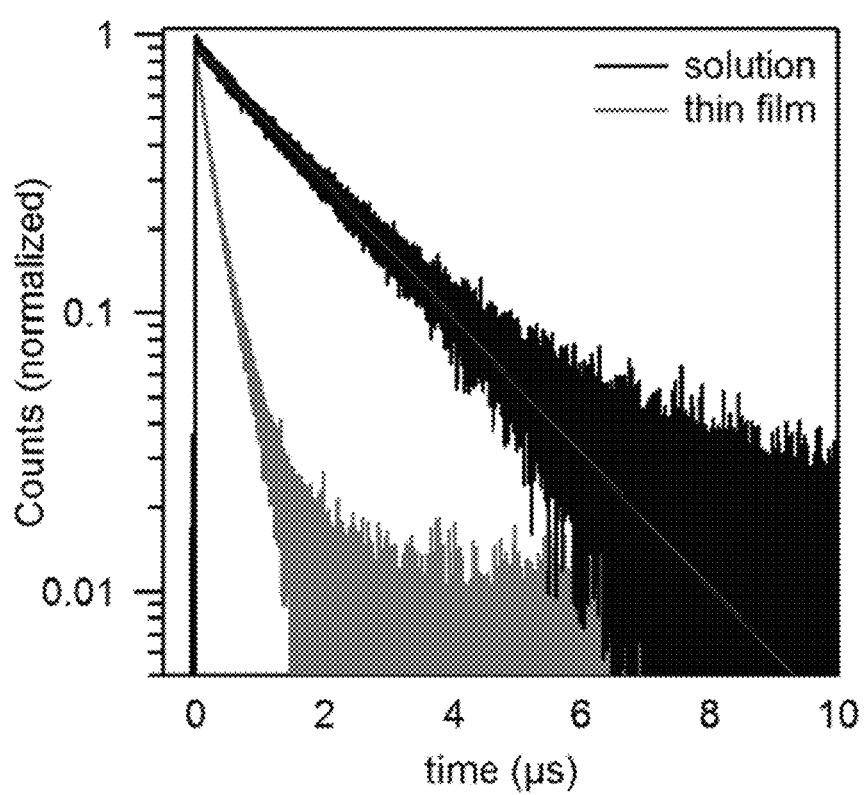

FIG. 14 shows photoluminescence lifetime measurements for NCs dispersed in TCE and drop cast into a thin film. An exponential fit to the solution data gives a lifetime of 1.8 μs.

Figure 15:
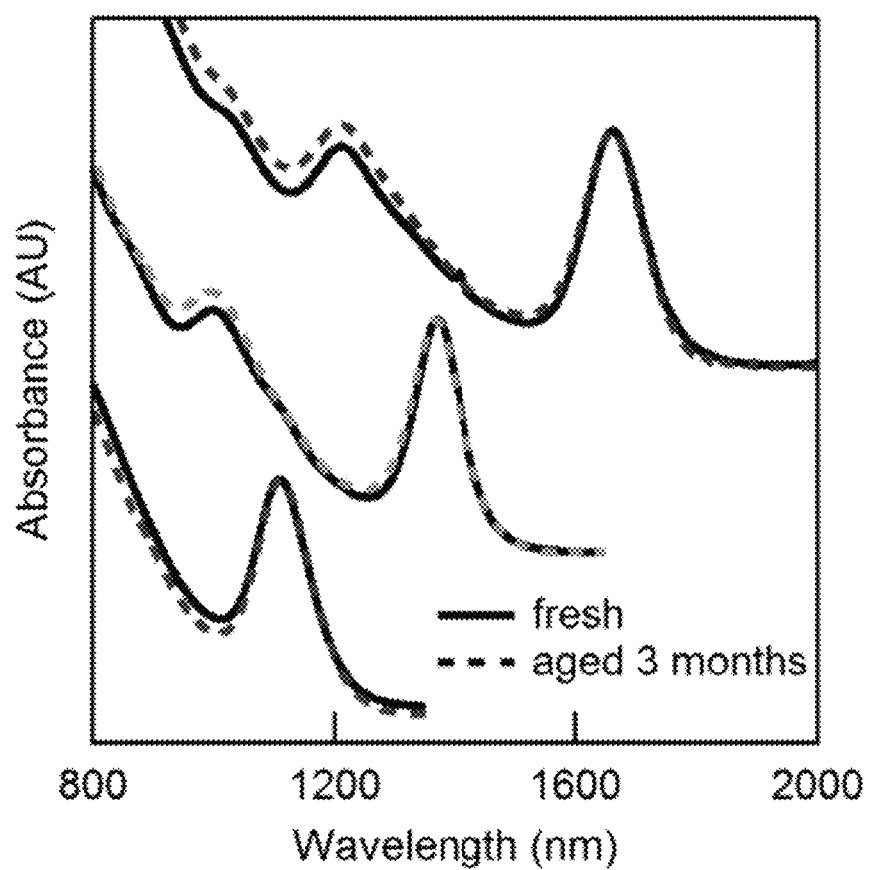

FIG. 15 shows absorption spectra for 4.7, 5.9, and 7.4 nm diameter PbS NCs. The black solid lines are spectra taken immediately after synthesis while the dashed colored lines are after the NCs have been stored dry and under ambient conditions for 3 months. For all sizes, the peak positions are maintained and HWHM does not increase with time.

Figure 16A:
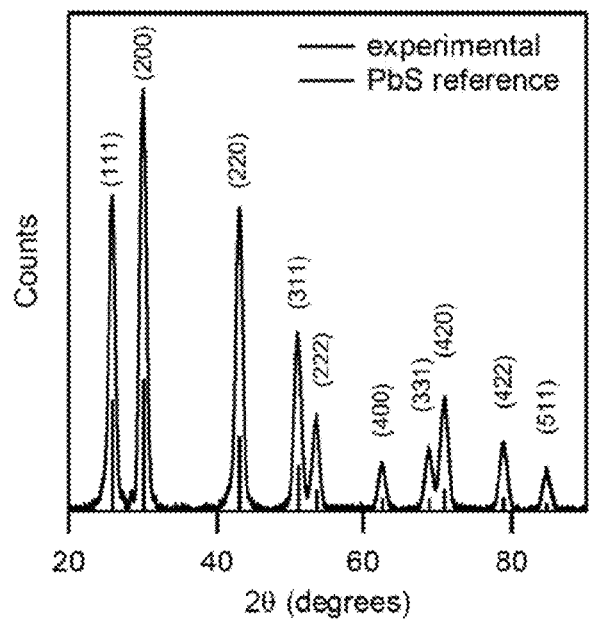
Figure 16B:
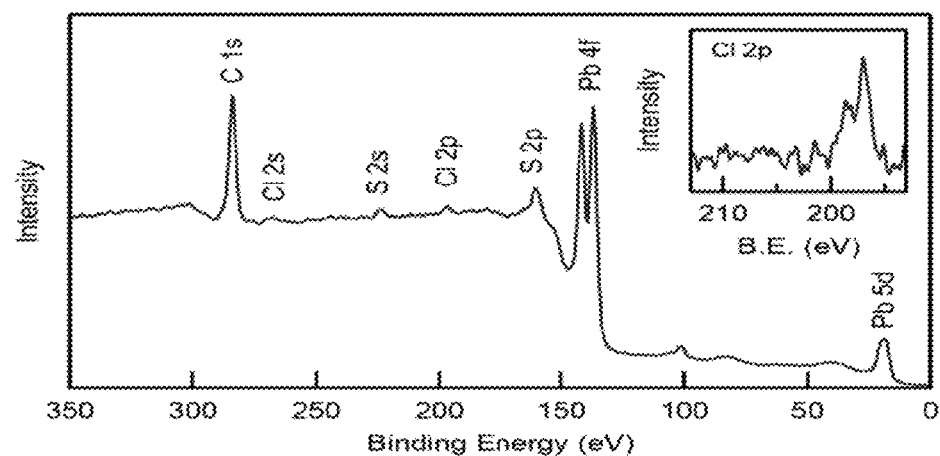

FIG. 16(a) shows XRD pattern of a NC batch showing the expected diffraction pattern for PbS and none of the peaks which correspond to crystalline $PbCl_2$. FIG. 16(b) shows XPS survey scan on the same batch of NCs, showing signal from chlorine which resides on the surface of the nanocrystals. Inset is the high resolution scan of the 2p peak of chlorine.

Figure 17:
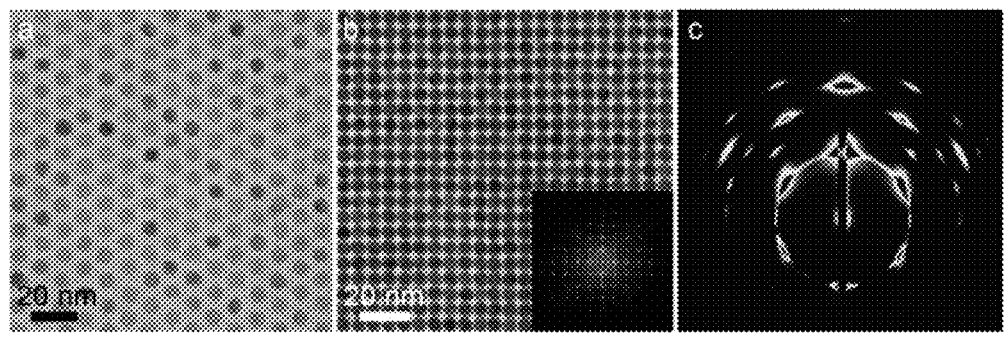

FIG. 17 shows two and three dimensional self-assembly of PbS NCs. The TEM image in (a) of a NC monolayer shows near ideal hexagonal close packing The TEM image in (b) shows a three dimensional superlattice approximately 5 layers thick (inset is the Fourier transform of the image). GISAXS pattern in (c) shows long range ordering in a BCC superlattice. Scale bars are 20 nm.

Figure 18:
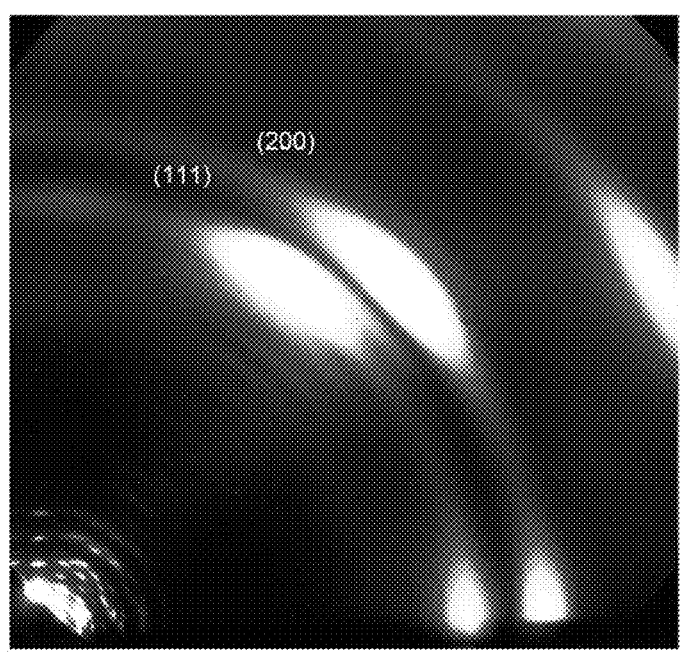

FIG. 18 shows wide angle X-ray scattering (WAXS) pattern from NCs dropcast from a toluene solution at 50 mg/mL onto a silicon wafer.

Figure 19:
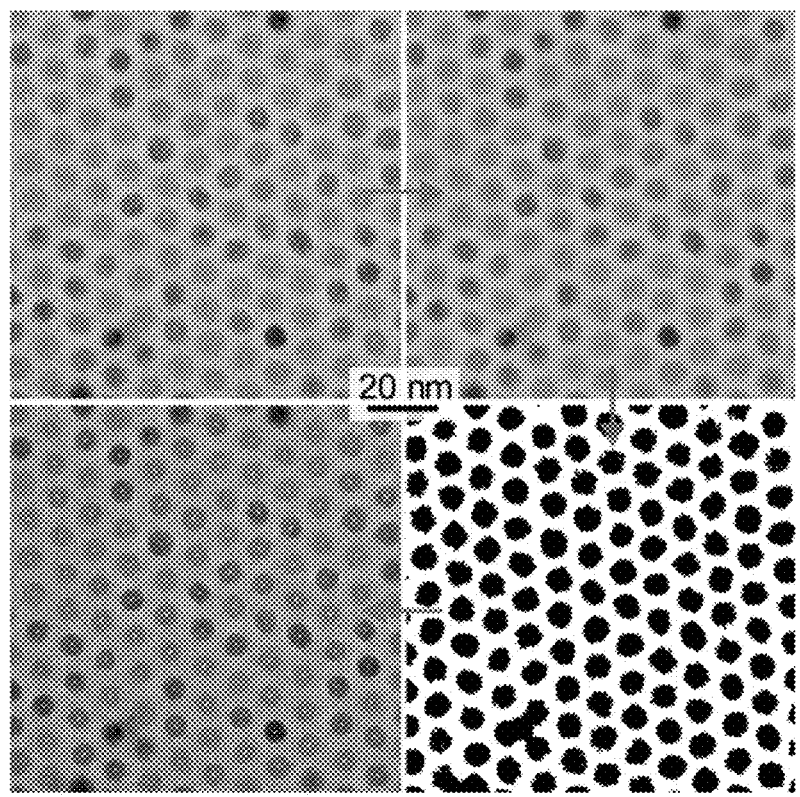

FIG. 19 shows the typical process used for TEM image analysis performed using ImageJ software.

DETAILED DESCRIPTION

Lead sulfide (PbS) nanocrystals (NCs) have a size-dependent, tunable band gap which makes them particularly interesting for photovoltaics, photodetectors, and infrared light emission. See, for example, Ip, A. H. et al, *Nat. Nanotechnol.* 2012, 7, 577-582; Lunt, R. R. et al., *Adv. Mater.* 2011, 23, 5712-5727; Talapin, D. V. et al., *Chem. Rev.* 2010, 110, 389-458; Konstantatos, G. et al., *Nature* 2006, 442, 180-183; Sun, L. et al., *Nat. Nanotechnol.* 2012, 7, 369-373, each of which is incorporated by reference in its entirety. In most of these applications it is desirable to have monodisperse NCs, that is, nanocrystals of nearly all the same size. For photovoltaics, monodispersity creates a flat energy landscape, which should maximize the rate at which charge carriers can be extracted from the NC film. See, for example, Guyot-Sionnest, P., *J. Phys. Chem. Lett.* 2012, 3, 1169-1175, which is incorporated by reference in its entirety. Furthermore, simulations suggest that having the narrow absorption imparted by monodispersity is key for maximizing photovoltaic efficiency. See, for example, Zhitomirsky, D. et al., *Nano Lett.* 2012, 12, 1007-1012, which is incorporated by reference in its entirety. Monodispersity is also critical for the formation of superlattices among the nanocrystals. See, for example, Murray, C. B. et al., *Annu. Rev. Mater. Sci.* 2000, 30, 545-610, which is incorporated by reference in its entirety. Such ordered arrangements of nanocrystals increase the packing fraction (better light absorption per volume) and can enhance inter-dot coupling to increase the potential for band-like transport. See, for example, Hanrath, T., *A Vacuum, Surfaces, Film.* 2012, 30, 030802, which is incorporated by reference in its entirety. For infrared photodetection and emission, monodispersity provides narrow and well-controlled absorption and emission. In their visible light counterparts, these have been found to be the crucial parameters necessary for commercial viability. See, for example, Steckel, J. S. et al., *SID Symp. Dig. Tech. Pap.* 2013, 44, 943-945, which is incorporated by reference in its entirety. In addition, having NCs of all the same size and band gap eliminates a variable from fundamental studies of NC excitonic structure and photophysical processes such as multiple exciton generation (MEG) and hot electron transfer. See, for example, Semonin, O. E. et al., *Science* 2011, 334, 1530-1533; Tisdale, W. A. et al., *Science* 2010, 328, 1543-1547, each of which is incorporated by reference in its entirety.

For single junction photovoltaic applications, it is desirable to use an active layer with band gap in the range of 1-1.5 eV (peak absorption of 1240-825 nm). See, for example, Shockley, W. et al., *J. Appl. Phys.* 1961, 32, 510-519, which is incorporated by reference in its entirety. In PbS NC films, large energetic disorder can trap photogenerated charge carriers and prevent them from being extracted as electrical current. Equation 3 predicts that in order to have a HWHM energy spread of 25 meV at these band gap values of 1.0 and 1.5 eV, dispersity values of 2.3 and 1.3% would be required, respectively. Synthetically, obtaining such monodispersity is a significant challenge.

Despite the benefits offered by monodisperse nanocrystal ensembles, current synthetic methods for PbS NCs have lagged behind those for cadmium selenide (CdSe) and lead selenide (PbSe). See, for example, Murray, C. B. et al., *J. Am. Chem. Soc.* 1993, 115, 8706-8715; Chen, O. et al., *Nat. Mater.* 2013, 12, 445-451; Peng, Z. A. et al., *J. Am. Chem.*

Soc. 2001, 123, 183-184; Abe, S. et al., *ACS Nano* 2012, 6, 42-53; Talapin, D. V. et al., *Nano Lett.* 2001,1, 207-211; Murray, C. B. et al., *IBM J. Res. Dev.* 2001, 45, 47-56; Wehrenberg, B. L. et al., *J. Phys. Chem. B* 2002, 106, 10634-10640; Du, H. et al., Nano Lett. 2002, 2, 1321-1324; Yu, W. W. et al., *Chem. Mater.* 2004, 16, 3318-3322, each of which is incorporated by reference in its entirety. While the band gaps of PbS and PbSe NCs can be tuned over similar ranges, PbS offers unique advantages in optoelectronic devices, such as improved air stability and the higher abundance/lower cost of sulfur as compared to selenium. See, for example, Moreels, I. et al., *ACS Nano* 2011, 5, 2004-2012; Wadia, C. et al., *Environ. Sci. Technol.* 2009, 43, 2072-2077, each of which is incorporated by reference in its entirety. Further, PbS is consistently the highest-performing material used in NC solar cells. See, for example, Thon, S. M. et al., *ACS Nano* 2013, 7, 7680-7688; Brown, P. R. et al., *Nano Lett.* 2011, 11, 2955-2961, each of which is incorporated by reference in its entirety.

A nanocrystal can have the formula MX, where M can be cadmium, zinc, magnesium, mercury, aluminum, gallium, indium, thallium, or mixtures thereof, and X can be oxygen, sulfur, selenium, tellurium, nitrogen, phosphorus, arsenic, antimony, or mixtures thereof. The method of manufacturing a nanocrystal is a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal.

The molar ratio between M and X can vary. For example, the molar ratio between M and X can be more than 15; the molar ratio between M and X can be more than 20; the molar ratio between M and X can be between 23 and 25; the molar ratio between M and X can be 24.

Qualitatively, when the amount of M is much more than X, X is consumed as the reaction proceeds, which can indicate that nanocrystal growth is occurring through monomer addition. The NCs can be monodisperse as soon as the nucleation takes place. It is possible that they can continue to grow in a monodisperse fashion until the point at which the X monomer has become depleted and marks the onset of Ostwald ripening. By going to very high M:X ratios, there can be less nuclei being formed during the initial nucleation burst. As it is believed that larger quantities of M precursor increases the solution viscosity and reduce mass transfer, it follows that the number of nuclei initially formed is inversely proportional to the M precursor concentration. Forming fewer nuclei can leave more X monomer available to add to existing nuclei after the nucleation burst, and can prolong the time during which nanocrystals grow via monomer addition. Examples of precursors can be oxides of species M or halides of species M. For instance, these can be lead oxide (PbO) or lead chloride ($PbCl_2$). Examples of precursors for species X can be a silane form of X or X in its elemental form. For instance, these could be bis(trimethylsilyl) sulfide or elemental sulfur.

There are different methods which have emerged for the colloidal synthesis of PbS NCs. In one method, lead oleate is formed by combining lead oxide (or lead acetate) with oleic acid at high temperatures. Bis(trimethylsilyl)sulfide, or TMS-S, is then injected into the lead oleate to form PbS NCs. Generally, the Pb:S precursor stoichiometry is 2:1. The recipe has a large synthetic range (800-1800 nm peak absorption), but has the drawbacks of limited air stability, anisotropic nanocrystals (which could limit the potential for superlattice formation), and size dispersity of 10-15%. See, for example, Tang, J. et al., *ACS Nano* 2010, 4, 869-878; Ihly, R. et al., *ACS Nano* 2011, 5, 8175-8186, each of which is incorporated by reference in its entirety.

In another method, lead chloride ($PbCl_2$) is dissolved in oleylamine (OLA) and reacts with sulfur (S), also dissolved in OLA. See, for example, Cademartiri, L. et al., *J. Phys. Chem. B* 2006, 110, 671-673, which is incorporated by reference in its entirety. The recipe produces NCs with absorption from 1200-1600 nm. The synthetic range can be extended through the addition of tri-n-octylphosphine (TOP) so that absorption could be tuned from 925-2100 nm.

PbS can also be synthesized using other methods. The Pb:S precursor stoichiometry can be a critical parameter affecting the size dispersity of the NC ensemble as the NCs grow in solution over time. A similar strategy can be used in CdSe NC synthesis to maximize reaction yield and minimize dispersity. With low Pb:S ratios in the range of 4:1, the absorption linewidth can reach a minimum only a few minutes after the initial injection, then increases as the NCs continue to grow. This minimum in absorption half width at half maximum (HWHM) can represent the depletion of S monomer and the onset of Ostwald ripening. By increasing the Pb:S ratio to as much as 24:1, the onset of linewidth broadening can be delayed for up to 6 hours, making it possible to synthesize monodisperse PbS NCs having peak absorption over a range of 1000-1800 nm (1.25-0.70 eV, 4.3-8.4 nm diameter) and size dispersities of 3-5%, without performing size-selective precipitations. The HWHM of the first absorption peak can reach values as low as 20 meV. The NCs can have correspondingly narrow emission peaks and small Stokes shifts. The NCs can exhibit exceptional air stability, as evidenced by high quantum yield (QY) and unchanging absorption spectra when stored in air for several months.

Pb:S precursor stoichiometry can be a critical parameter affecting the absorption linewidth of PbS NCs. By employing a 24:1 Pb:S precursor stoichiometry ratio, it is possible to synthesize monodisperse PbS NCs with peak absorption over a range of 1000-1800 nm (1.25-0.70 eV) and size dispersities of 3-5%. The NCs synthesized have tunable infrared emission with small Stokes shifts and QY of 30-60%. The NCs can be air-stable for several months and that they readily self-assemble into ordered lattices. A method to quickly and effectively remove excess precursor materials can be used such that purification can be completed within 24 hours of synthesis. Such NCs may be useful for photovoltaics, optoelectronics, and fundamental studies of NC photophysics.

By controlling the ratio of lead precursor to sulfur precursor, highly monodisperse (size dispersity <5%) PbS nanocrystals over a wide range of sizes (band gaps from 0.70-1.25 eV, or 1000-1800 nm) can be produced.

EXAMPLE

Materials

Lead (II) chloride (Alfa Aesar, 99.999%), sulfur (Sigma-Aldrich, >99.99%), oleylamine (Acros Organics, 80-90%), and oleic acid (Sigma-Aldrich, 90%) were used without further purification.

Synthesis

Lead (II) chloride (Alfa Aesar, 99.999%), sulfur (Sigma-Aldrich, >99.99%), oleylamine (Acros Organics, 80-90%), and oleic acid (Sigma-Aldrich, 90%) were used without further purification. Briefly, 0.040 g of S were added to 7.5 mL of OLA in a one neck flask. This flask was heated to 120° C. in an oil bath for 20 minutes with nitrogen bubbling through the solution. The S solution was then allowed to cool to room temperature, maintaining the nitrogen bubbling. The Pb solution was prepared in a three neck flask by adding 2.50 g of $PbCl_2$ to 7.5 mL of OLA. On a Schlenk line, the flask was degassed for 10 minutes to a pressure of ~150 mTorr. It was then heated under nitrogen to 120° C. At this point, the temperature was adjusted to the desired injection/growth temperature of 40° C., 80° C., or 120° C. 2.25 mL of the S solution were swiftly injected, resulting in a nucleation burst as evidenced by the solution turning black in color. This reaction stoichiometry is 9 mmol Pb and 0.375 mmol of S, a 24:1 ratio. To access the other ratios studied here, the amount of $PbCl_2$ was changed while keeping S the same. To quench the reaction, the three neck cell was immersed in a water bath and 20 mL of cold hexanes were injected into the flask.

Synthesis at 120° C. Synthesis was performed on a Schlenk line using standard air-free techniques. The sulfur (S) solution was prepared by adding 0.040 g S to 7.5 mL of oleylamine (OLA) in a one neck flask. The flask was then immersed in an oil bath at 120° C. Nitrogen was bubbled through the solution while stirring for 20 minutes until all the S has dissolved and the solution is amber in color. The S solution was then removed from the oil bath and allowed to cool to room temperature, still under nitrogen bubbling. Meanwhile, the lead (Pb) solution was prepared by adding 2.50 g (9 mmol) of lead chloride ($PbCl_2$) to 7.5 mL of OLA in a three neck flask. The lead solution was degassed using the Schlenk line vacuum for 10 minutes while stirring until it reached a pressure of ~150 mTorr. The three neck flask was then pressurized with nitrogen and the temperature controller was set for 120° C. As the temperature was increasing and reached ~110° C., the flask was put under vacuum for 5 minutes. After this, the flask was pressurized with nitrogen and at this time the Pb solution is typically colorless and clear with some undissolved $PbCl_2$ still remaining Once the Pb solution reached a steady value of 120° C., 2.25 mL of the S solution (0.375 mmol) were swiftly injected. The solution immediately changed from colorless to black, indicative of a nucleation burst. The solution was then kept at 120° C. for the desired growth time before being quenched. Quenching the reaction consists of removing the heating mantle, injecting 20 mL of cold hexanes into the flask, and immersing the flask in a water bath. A typical synthesis yields ~100 mg of product and the recipe was found to be amenable to scale-up. This method described above is for a 24:1 ratio synthesis. To access other ratios, the amount of Pb precursor was changed while keeping the amount of S precursor the same.

Synthesis at 40° C. and 80° C. Synthesis at lower temperatures follows the same procedures as above, including heating the Pb solution to 120° C. first. The temperature was then decreased and allowed to reach the setpoint value. The nucleation burst can take a few seconds longer to occur at lower temperatures than at 120° C.

PbS Synthesis with Additional S Added During the Synthesis

In a similar setup, a synthesis of PbS used an 8:1 Pb:S precursor ratio. In this synthesis, 0.375 mmol of sulfur is initially injected into 3 mmol of lead precursor to form the nanocrystal nuclei. One minute after this initial injection, 0.188 mmol of sulfur is then added dropwise over the course of one minute—a rate of 0.188 mmol/min. The second addition of sulfur is done in a slow manner so as not to cause a second nucleation burst, but to supply additional sulfur monomer which will add to existing nuclei and allow monodisperse growth to occur for longer times. Indeed, in this experiment shows the increase in HWHM can be delayed in the 8:1 synthesis such that it behaves more like a 24:1 synthesis, as shown in FIG. 4(b).

These results confirm the hypothesis that the HWHM increase is a result of sulfur monomer depletion. Additionally, it means that a large excess of lead precursor (ie a 24:1 ratio) is not necessarily needed in order to synthesize monodisperse PbS NCs over a wide range. Rather, if the sulfur monomer is not depleted, monodisperse growth can occur for a more modest ratio, such as 8:1. This allows a more economical use of the precursors and could be particularly impactful when synthesizing large quantities.

Purification/Ligand Exchange

Figure 1:
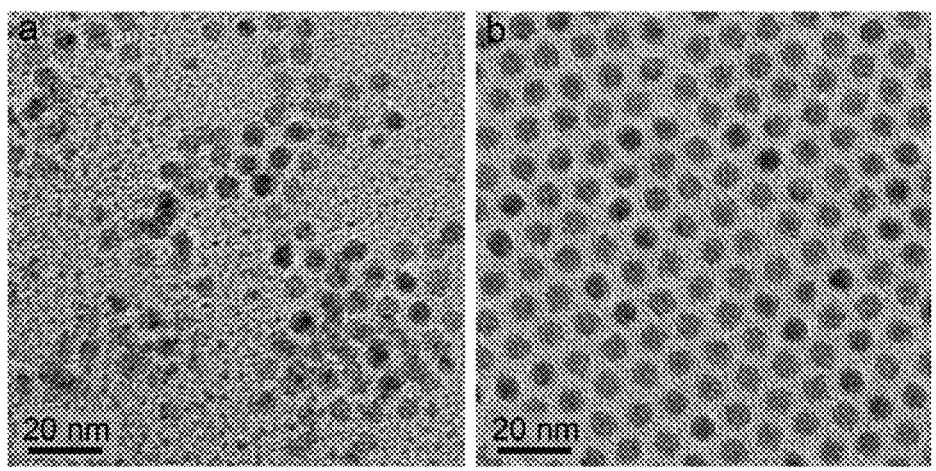
FIG. 1 shows TEM images of the same PbS NCs taken (a) before purification steps and (b) after purification steps.

Purification of the NC product is a critical step to remove unreacted precursor materials as well as excess solvent. As seen in previous works using $PbCl_2$ as the Pb precursor source, a significant drawback of this method is the presence of unreacted $PbCl_2$ in the final product (see FIG. 1). This $PbCl_2$ can remain in solution for weeks to months, especially when using the highly non-stoichiometric Pb:S ratios employed here. These impurities would likely be detrimental to device performance, so it is desirable to be able to quickly and effectively remove them. Two different purification methods can be used to remove excess precursors, with all steps being performed under ambient conditions.

The first purification method is the more traditional way of crashing out using alcohols. Typically, butanol and methanol are used to destabilize the NC suspension such that centrifugation results in the NCs crashing out of the solvent. However, the alcohols will also crash out unreacted $PbCl_2$, making it difficult to separate the PbS NCs from the unreacted $PbCl_2$. Adequate purification using this method is possible, but that the NCs suspensions must be centrifuged frequently for weeks after synthesis until all the $PbCl_2$ has precipitated.

An alternative purification method is to use OA to destabilize the NCs, as first suggested by Cademartiri et al. Unlike the alcohol anti-solvents, OA selectively crashes out the NCs, but not the $PbCl_2$ or S. OA can be used to crash out the NCs 3-5 times to ensure that all precursors have been removed.

Additionally, being able to crash out up to 5 times without compromising colloidal stability indicates that the OA will not strip ligands off the surface of the NCs, as alcohol anti-solvents have been shown to do with other types of nanocrystals. See, for example, Hassinen, A. et al., *J. Am. Chem. Soc.* 2012, 134, 20705-20712, which is incorporated by reference in its entirety.

After synthesis, NCs were purified to remove excess unreacted precursors and solvent. This involved crashing out the NCs using anti-solvents followed by centrifugation. The methods used for purification are discussed in greater detail in the next section. In all cases the oleylamine ligands native to the NCs were exchanged for oleic acid (OA) ligands to improve colloidal stability.

It is important to always crash out all of the PbS NCs from solution during purification, such that the supernate is either colorless or orange (from unreacted S). This way the observed monodispersity is not influenced by performing size-selective precipitations.

Purification with alcohols. After synthesis, the products were stored overnight, during which time a large amount of white $PbCl_2$ precipitated out of solution. The $PbCl_2$ was removed by centrifugation at 4000 rpm for 3 minutes. The NCs were then crashed out of solution by the addition of alcohol anti-solvents (~10 mL BuOH and ~5 mL MeOH). They were centrifuged and the supernate was discarded. The NC solid was allowed to dry for several hours before being redispersed in 20 mL of hexanes. If the dispersion appears turbid, it was again centrifuged to remove excess $PbCl_2$. A ligand exchange was then performed to give the NCs better colloidal stability. 2 mL of oleic acid (OA) were added to the dispersion and agitated for 1 minute. The NCs were crashed out of solution by the addition of antisolvents and allowed to dry. This OA ligand exchange was repeated once more before finally dispersing the NCs in an organic solvent.

Purification with oleic acid. After synthesis, the products were crashed out of solution using ~10 mL of BuOH and ~5 mL of MeOH. The precipitate was redispersed in ~10 mL of hexane and then 200% OA by volume was added. The mixture was agitated for several minutes. The NCs were then crashed out via centrifugation at 4000 rpm for 3 minutes. The supernate may contain unreacted S, as indicated by an orange color. The precipitate is allowed to dry for several minutes. This crash out procedure with OA is then repeated 3-5 times, until the supernate is colorless. The NC precipitate is then redispersed in hexane and crashed out with BuOH and MeOH once again to remove any OA not bound to nanocrystals. Should the XRD pattern show the presence of $PbCl_2$, the crash out procedure with OA can be repeated a few more times.

Aliquots

During many of the reactions, ~1 mL aliquots were removed at various growth times in order to track the reaction process and increase the number of data points per synthesis. The aliquots were removed from the three neck flask and immediately injected into 5 mL of cold hexanes to quench the reaction. The purification of these small amounts of solution was slightly different, as their colloidal stability to be less robust. As before, the NCs were left in their centrifuge tube overnight and centrifuged the following day to remove precipitated $PbCl_2$. The NCs were then crashed out (~3 mL BuOH and ~2 mL MeOH) and centrifuged. After drying for several hours, the NCs were redispersed in hexanes and 0.5 mL of OA was added. If the suspension was turbid, it was centrifuged to remove excess $PbCl_2$. The NCs were crashed out of solution, dried for several hours, and redispersed in the desired organic solvent.

Characterization

Absorption spectra were measured using a Cary 5000 UV-Vis-NIR spectrophotometer. The NCs were suspended in tetrachloroethylene for these measurements.

Photoluminescence (PL) spectra and PL lifetime measurements were performed using an InGaAs/InP single-photon counter from Micro Photon Devices. Infrared emission from the NCs was focused into a spectrograph (Acton 2500, Princeton Instruments) for the PL spectra measurements. Solution phase measurements were conducted with samples dispersed in tetrachloroethylene and were stirred for the duration of the measurement. Thin film samples were prepared by drop casting a concentrated solution onto glass microscope slides. The samples were excited by a 405 nm laser operating in either continuous wave mode for PL spectra or in pulsed mode for PL lifetime measurements. For lifetime measurements, the total counts were kept below 4% of the laser repetition rate to ensure detection is not biased towards early arriving photons.

Transmission electron microscopy (TEM) was performed on a JEOL 2011 operating at 200 kV and using an objective aperture to increase mass-thickness contrast. Image analysis to determine average particle size and dispersity was done with the freely available software ImageJ. High resolution TEM (HRTEM) images were taken on a JEOL 2010F operating at 200 kV. Samples were prepared by drop casting NC suspensions in hexane onto TEM grids coated with an amorphous carbon support film.

Small angle X-ray scattering (SAXS) was measured on a Rigaku Smartlab with Cu Kα source operating at 45 kV and 200 mA. Samples were prepared by filling glass capillaries with suspensions of NCs in toluene at concentrations of ~25 mg/mL. The instrument was configured using transmission mode geometry and parallel beam optics. The experimental SAXS data were fit using Rigaku NANO-Solver software to model the form factor of spherical PbS nanocrystals in a matrix of toluene. The back ground scattering from a pure toluene capillary was subtracted from the experimental data. The software also accounted for instrumental smearing.

Grazing-incidence small angle X-ray scattering (GISAXS) was performed at the X9 beamline at the National Sychrotron Light Source at Brookhaven National Laboratory. X-rays were 13.5 keV (0.0918 nm) with an irradiated sample area of approximately 0.5 μ.m wide by 1 cm long. The incident angle of the X-ray beam was 0.2°. 2D scattering data was collected on a CCD detector which was calibrated using a silver behenate standard. NC films were deposited on single crystalline silicon wafers.

X-ray diffraction (XRD) was performed on a Rigaku Smartlab with Cu Kα source operating at 45 kV and 200 mA. Samples were prepared by drop casting a concentrated suspension of NCs in hexane onto a zero-background holder and allowing the solvent to evaporate.

X-ray photoelectron spectroscopy (XPS) spectra were collected using a PHI Versaprobe II equipped with a multichannel hemispherical analyzer and a monochromatic aluminum anode X-ray source operating at 100 W with a 100 μm beam scanned over a 1.4 mm line across the sample surface. A dual-beam charge neutralization system was used with an electron neutralizer bias of 1.2 eV and an argon ion beam energy of 10 eV.

XRD Pattern

Figure 2:
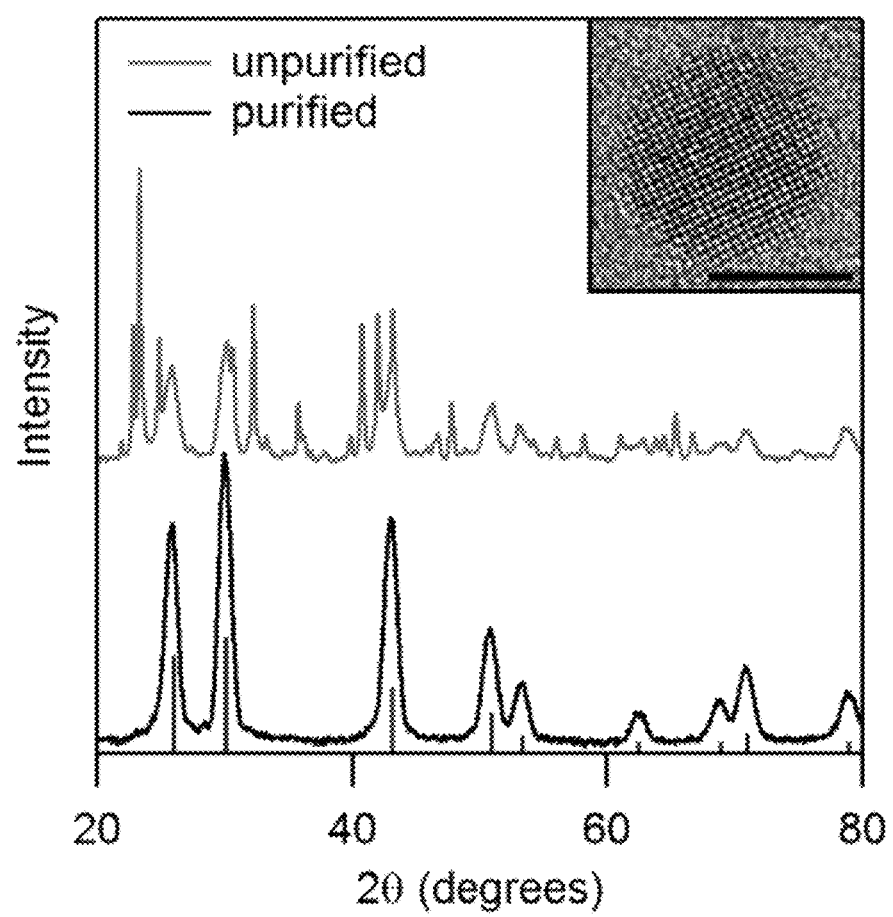
FIG. 2 shows XRD on as-synthesized NCs before purification (gray) and following purification with oleic acid (black). The blue vertical bars are the reference PbS peak locations (ICDD PDF number 00-005-0592). Inset is HRTEM of a single PbS NC. Scalebar is 5 nm.

FIG. 2 shows XRD patterns on the same batch of NCs, synthesized with a 24:1 Pb:S ratio, before (gray) and after (black) purification with OA as the anti-solvent. The many additional peaks observed in the unpurified sample correspond to diffraction from crystalline $PbCl_2$. The purified sample shows no peaks from crystalline $PbCl_2$ and only those expected for PbS. In total, the purification process using OA was completed less than 24 hours after synthesis, showing that it is possible to quickly remove unreacted precursors. XRD can be the most effective technique for evaluating purity, and note that a relatively fast scan from 20-40° is sufficient to determine if purification is complete.

HWHM

To determine the effect of Pb:S ratio on nanocrystal growth, PbS NCs were synthesized at 120° C. with Pb:S precursor ratios of 4:1, 8:1, and 24:1. After injection of the S solution into the Pb solution, growth was allowed to occur at 120° C. for several hours. During this time, the NCs increase in size and the first absorption peak shifts to longer wavelengths. The HWHM of the first absorption peak can be used as a metric for the size dispersity of the NCs, with a small HWHM value indicating low dispersity. The HWHM is determined from the peak absorption to the half max value at longer wavelength (i.e. to the right of the first absorption peaks shown in FIG. 3).

Figure 3:
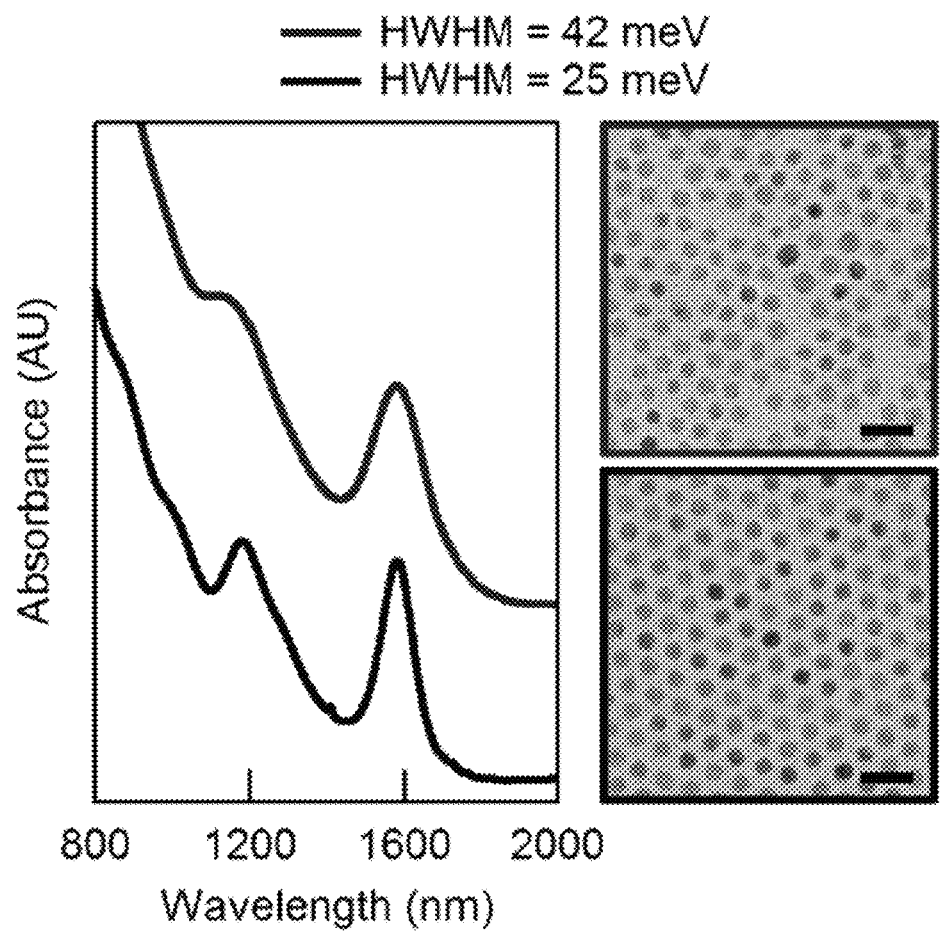
FIG. 3 shows comparison of absorption spectra and TEM micrographs for NCs having the same peak absorption but different HWHM values. TEM scale bars are 20 nm.

To illustrate that HWHM is a reliable metric for dispersity, the absorption spectra of NCs synthesized with the same first absorption peak location, but different peak HWHM values, can be compared in FIG. 3. The spectrum shown in red has a HWHM of 42 meV while the blue spectrum has a HWHM of only 25 meV. Five absorption features can be identified in the blue spectrum (determined by taking the second derivative of the data), whereas only two absorption features are observed in the red spectrum. The TEM images of these samples confirm the improved monodispersity of the HWHM of 25 meV sample over the 42 meV sample, as well as the ability to self-assemble, which is lacking in the 42 meV sample.

Figure 4A:
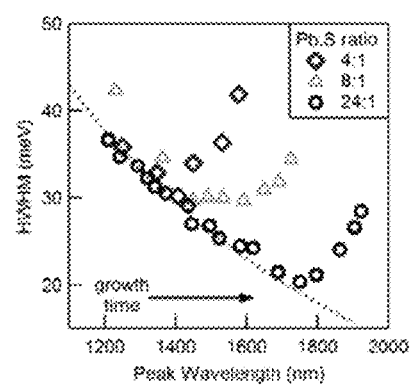
FIG. 4(a) shows half width at half maximum (HWHM) of the first absorption peak plotted versus peak wavelength for different Pb:S precursor ratios.; all syntheses were performed at a reaction temperature of 120° C.; the dashed gray line is a theoretical line of 3.3% size dispersity. In comparison with FIG. 4(a), FIG. 4(b) and FIG. 4(c) additionally show HWHM of the first absorption peak for PbS nanocrystals synthesized with 8:1 Pb:S initial ratio when additional S was added during the synthesis.
Figure 4B:
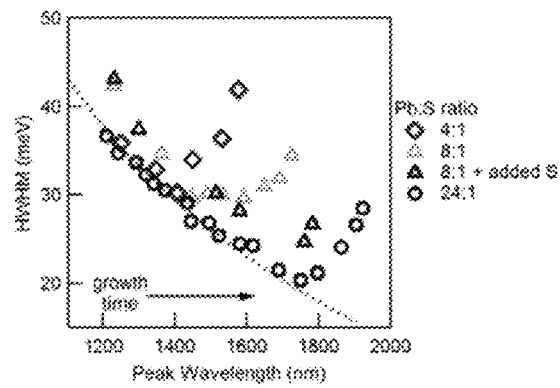
FIG. 4(d) additionally shows HWHM of the first absorption peak for PbS nanocrystals synthesized with 24:1 Pb:S initial ratio when additional S was added during the synthesis.
Figure 4C:
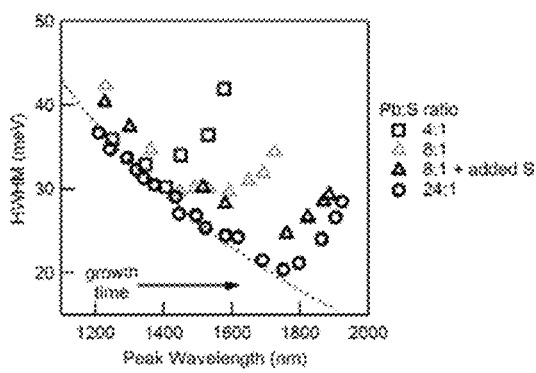
Figure 4D:
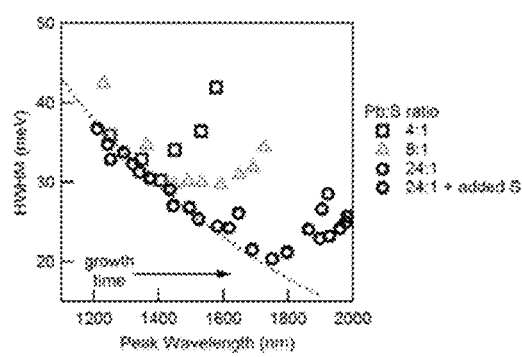

In FIG. 4(a), the HWHM for NCs synthesized with varying Pb:S precursor ratios was plotted as a function of their peak absorption wavelength. The smallest HWHM values obtained for at least two syntheses at each precursor ratio studied can be included. The predicted HWHM values for a NC ensemble having 3.3% size dispersity can also be included. For a 4:1 precursor ratio, the HWHM follows the line of constant monodispersity until growth reaches a peak wavelength value near 1400 nm, at which point HWHM begins increasing rapidly. With an 8:1 Pb:S ratio, the monodisperse growth occurred until about 1600 nm, at which point HWHM started to increase with increasing absorption wavelength. For a ratio of 24:1, the monodisperse growth can proceed up to 1800 nm, and reaches values as low as 20 meV.

In FIG. 4(a), the HWHM versus peak wavelength calculated using Equation 3 for an ensemble of NCs with 3.3% size dispersity was plotted. The HWHM is decreasing as the peak wavelength is increasing. This trend is expected due to the nonlinear relationship between band gap and nanocrystal size. For a fixed value of dispersity, the HWHM increases as the diameter of the NCs decreases because the band gap changes more drastically for small NCs than for large NCs. Thus, the HWHM is not an absolute measure of dispersity but rather it depends on the diameter of the NCs. A practical consequence of this trend is the difficulty in synthesizing very small PbS NCs which have minimal energetic disorder.

Figure 5:
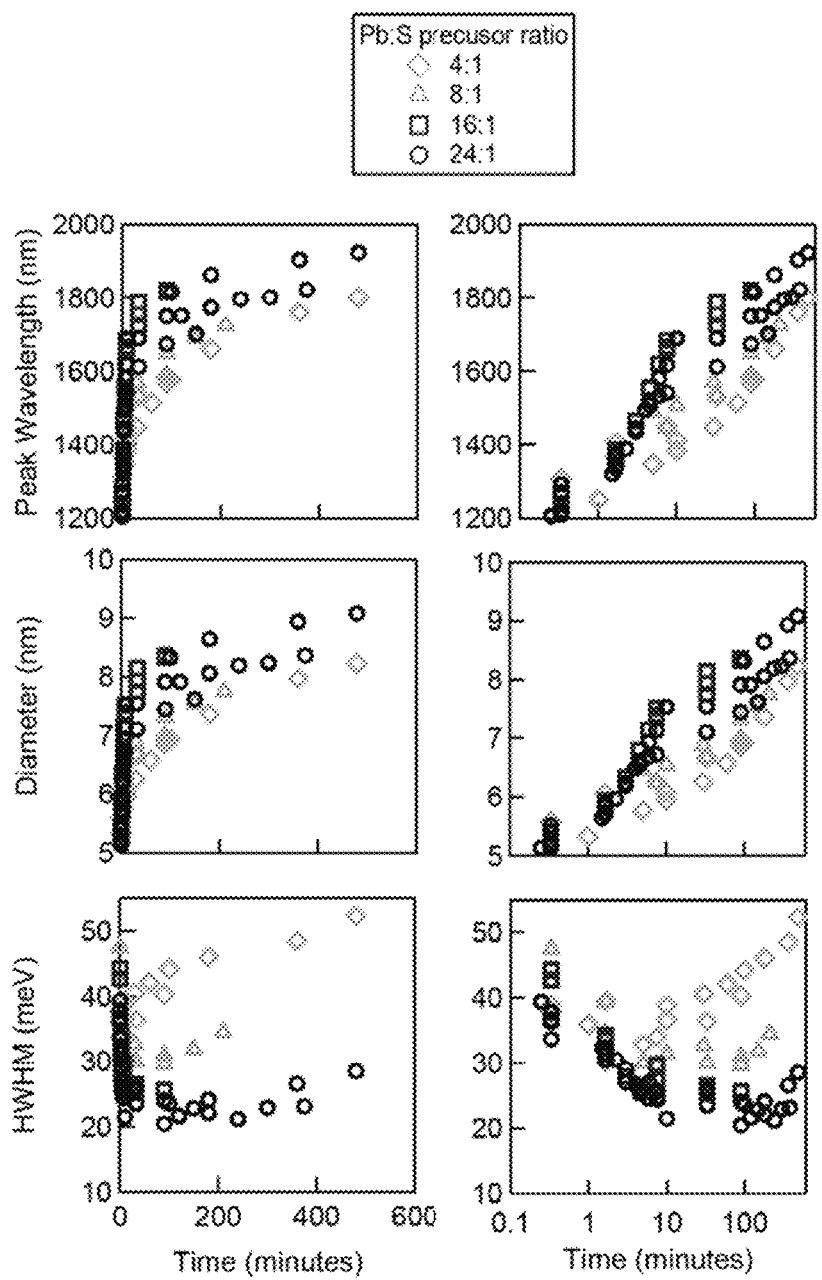
FIG. 5 shows peak wavelength, calculated NC diameter, and first absorption peak HWHM for NCs synthesized at 120° C. with varying ratios of Pb:S precursors. In the lefthand column, the data was plotted on a linear time scale while in the righthand column the same data is plotted on a logarithmic time scale to emphasize early timepoints.
Figure 6:
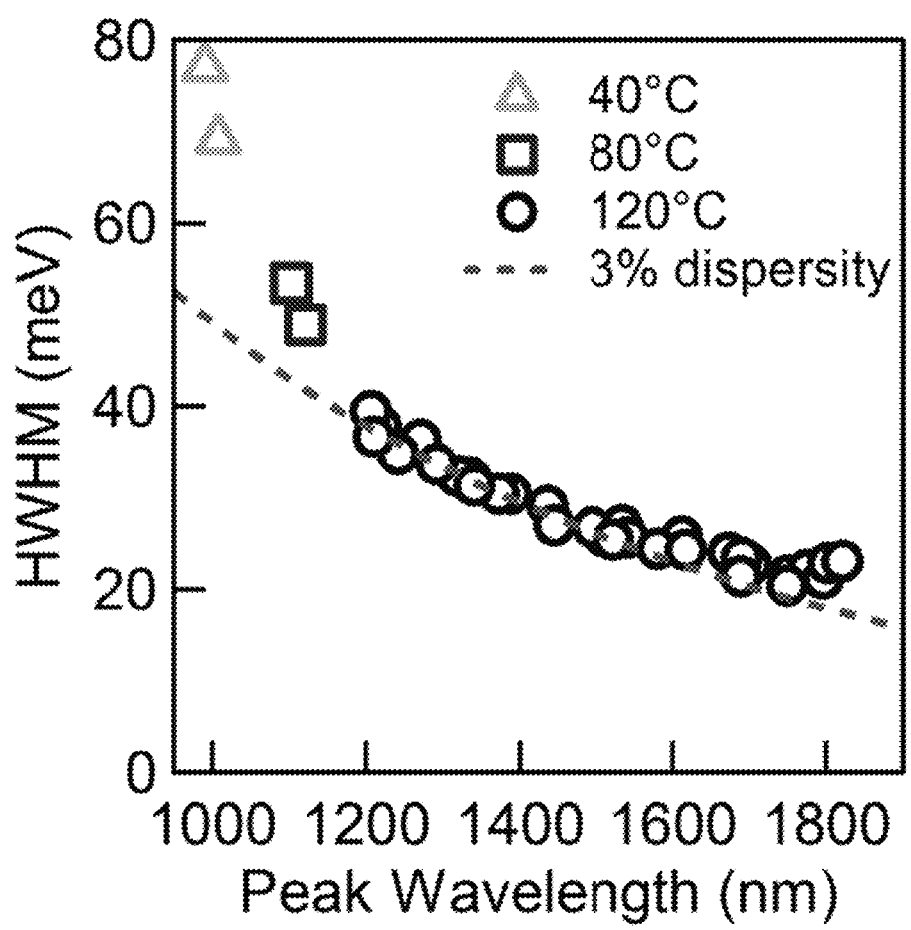
FIG. 6 shows lowest HWHM values achieved using 24:1 Pb:S ratio syntheses at three different temperatures. Monodisperse PbS NCs can be synthesized over the range of 1000-1800 nm.

FIG. 5 shows peak wavelength, calculated NC diameter, and first absorption peak HWHM for NCs synthesized at 120° C. with varying ratios of Pb:S precursors. In the lefthand column, the data was plotted on a linear time scale while in the righthand column the same data is plotted on a logarithmic time scale to emphasize early timepoints. FIG. 6 shows lowest HWHM values achieved using 24:1 Pb:S ratio syntheses at three different temperatures. Monodisperse PbS NCs can be synthesized over the range of 1000-1800 nm.

Table 1 shows HWHM values obtained using 24:1 syntheses with respect to their peak absorption wavelength.

| peak (nm) | band gap (eV) | HWHM (meV) |
|---|---|---|
| 991 | 1.25 | 77.0 |
| 1008 | 1.23 | 69.1 |
| 1103 | 1.12 | 53.4 |
| 1122 | 1.11 | 48.9 |
| 1206 | 1.03 | 39.4 |
| 1210 | 1.02 | 36.7 |
| 1219 | 1.02 | 37.8 |
| 1242 | 1.00 | 34.8 |
| 1270 | 0.98 | 36.3 |
| 1292 | 0.96 | 33.7 |
| 1320 | 0.94 | 32.3 |
| 1335 | 0.93 | 32.2 |
| 1341 | 0.92 | 31.3 |
| 1372 | 0.90 | 30.5 |
| 1388 | 0.89 | 30.5 |
| 1435 | 0.86 | 29.1 |
| 1445 | 0.86 | 27.0 |
| 1495 | 0.83 | 26.8 |
| 1508 | 0.82 | 25.9 |
| 1522 | 0.81 | 25.4 |
| 1534 | 0.81 | 27.0 |
| 1542 | 0.80 | 25.7 |
| 1581 | 0.78 | 24.5 |
| 1612 | 0.77 | 25.8 |
| 1617 | 0.77 | 24.3 |
| 1673 | 0.74 | 24.0 |
| 1689 | 0.73 | 21.5 |
| 1690 | 0.73 | 23.5 |
| 1702 | 0.73 | 22.8 |
| 1750 | 0.71 | 20.4 |
| 1751 | 0.71 | 21.6 |
| 1774 | 0.70 | 22.1 |
| 1796 | 0.69 | 21.2 |
| 1802 | 0.69 | 22.9 |
| 1821 | 0.68 | 23.1 |

Growth Mechanism

Figure 7:
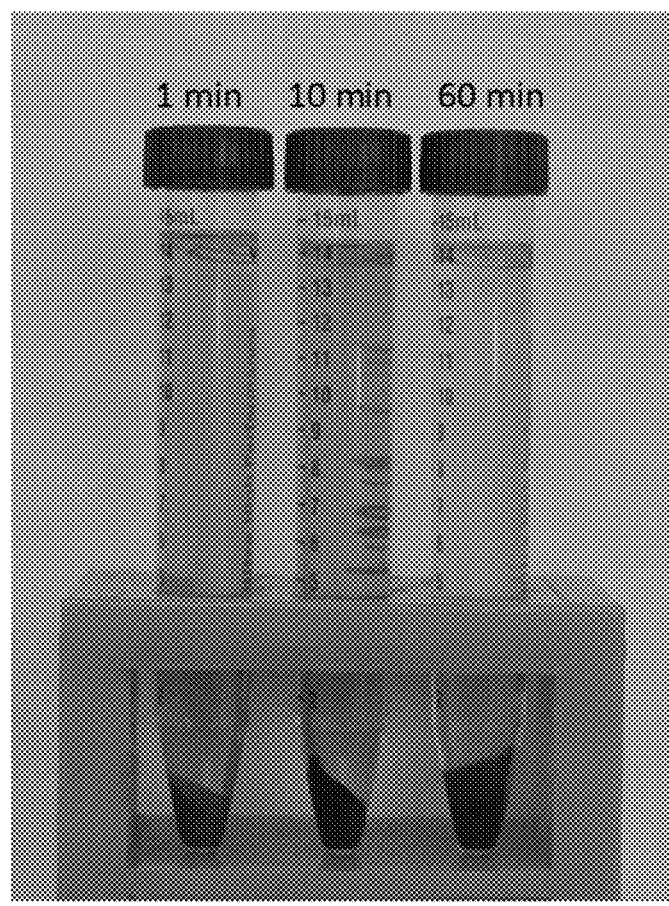
FIG. 7 shows 1mL aliquots removed from a 24:1 synthesis at time intervals of 1, 10, and 60 minutes after the initial injection. Adding excess OA crashes out the NCs but leaves the unreacted S in the supernate. It is noted that in the 1 minute vial there is also some S which remains in the precipitate. The image shows that S is continuously being consumed as the reaction progresses, supporting the hypothesis that HWHM begins to increase once the sulfur precursor has been completely consumed.

To investigate the growth mechanism, the amount of unreacted S present in a 24:1 ratio synthesis can be monitored by withdrawing aliquots as the reaction progressed. The NCs can then be crashed out using OA, leaving any unreacted S in the supernate (see FIG. 7). Qualitatively, S is consumed as the reaction proceeds, which indicates that nanocrystal growth is occurring through monomer addition. These findings are in line with the traditional model of nanocrystal size-focusing by diffusion-limited monomer addition from solution. See, for example, Talapin, D. V. et al., J. Phys. Chem. B 2001, 105, 12278-12285; Peng, X. et al., J. Am. Chem. Soc. 1998, 120, 5343-5344, each of which is incorporated by reference in its entirety. Interestingly, the NCs are observed to be monodisperse as soon as the nucleation takes place. They continue to grow in a monodisperse fashion until this increase in HWHM was seen. It is possible that this is the point at which the S monomer has become depleted and marks the onset of Ostwald ripening. Since the same molar amount of S monomer was injected, this would indicate that by going to very high Pb:S ratios, there are less nuclei being formed during the initial nucleation burst. As it is believed that larger quantities of $PbCl_2$ increases the solution viscosity and reduce mass transfer, it follows that the number of nuclei initially formed is inversely proportional to the $PbCl_2$ concentration Forming fewer nuclei leaves more S monomer available to add to existing nuclei after the nucleation burst, and prolongs the time during which nanocrystals grow via monomer addition. By varying the Cd and Se precursor concentration, the CdSe NC size and yield at minimum absorption linewidth ($HWHM_{min}$) can also be tuned. The large excesses of Se with respect to Cd precursor can result in $HWHM_{min}$ being achieved at longer growth times and larger NC sizes.

A 24:1 precursor ratio can be used, as it consistently produces monodisperse NCs over the range of interest. However, it is observed that for short growth times, monodisperse NCs can be produced when using Pb:S ratios of 4:1 or 8:1, and it is possible that this can produce a higher reaction yield. The data in FIG. 4(a) show that at a reaction temperature of 120° C., the smallest NCs produced have a peak absorption near 1200 nm. To increase the synthesis range, particularly to access smaller sized NCs which are useful in photovoltaic applications, the reaction temperature was decreased to either 80° C. or 40° C. These lower temperatures allowed us to access peak absorption in the 1000-1200 nm range, but resulted in slightly larger dispersity and less consistency. In Table 2, guidelines are suggested for accessing a desired peak absorption using the synthetic protocol described here (see FIG. 8 for peak wavelength as a function of growth time and temperature).

TABLE 2

Guidelines for PbS NC Synthesis

| Peak Absorption (nm) | Temperature (° C.) | Growth Time |
|---|---|---|
| 975-1050 | 40 | 10 s-5 m |
| 1050-1200 | 80 | 10 s-30 m |
| 1200-1800 | 120 | 10 s-6 h |

PbS of Different Sizes

FIG. 9 contains select absorption spectra for the 24:1 synthesis method, normalized by peak amplitude and offset for clarity. The overall range is 1000-1800 nm, or 1.25-0.70 eV. The two spectra at the bottom of FIG. 9, shown in dark violet and purple, were synthesized at 40° C. and 80° C., respectively. All other spectra were synthesized with a reaction temperature of 120° C. In almost all spectra it is possible to see many higher energy absorption features. When plotted vs. wavelength, the peaks appear to broaden at longer wavelengths, but energetically the peak widths are continuously decreasing (see FIG. 10 for the same spectra plotted versus energy).

To further characterize the NCs, TEM and SAXS can be used to determine the average diameter of the NCs (see FIG. 11 for typical data analysis). In total, twelve samples were analyzed using TEM and SAXS (ten of which were measured using both methods). In FIG. 12, the band gap of each NC can be plotted versus its measured diameter. The data plotted in FIG. 12 are available in Table 3. The data was fitted to an empirical equation of the form, $$E_g = c + \frac{1}{ad^2 + bd} \quad (1)$$

where c is the bulk band gap of PbS (0.41 eV) and a and b are fitting parameters.

The best-fit form is, $$E_g = 0.41 + \frac{1}{0.0392d^2 + 0.114d} \quad (2)$$

where $E_g$ is expressed in eV and the NC diameter d is expressed in nanometers.

Using the empirically determined correlation between band gap and NC size, it is possible to relate the peak absorption HWHM to the size dispersity (a). To do this, it can be assumed the first absorption peak is Gaussian in form and that the absorption line shape for a single NC is a delta function. This assumption can lead to a systematic overestimation of the size dispersity because the homogeneous linewidth of a single PbS NC was not accounted. In terms of the parameters defined in Equation 1, one may derive an expression for the HWHM as a function of mean diameter, d, and size dispersity, σ, $$HWHM(d, \sigma) = \frac{\sigma(a\gamma^2 d\sigma + 2a\gamma d + b\gamma)}{(\gamma\sigma + 1)(ad + b)(a\gamma d\sigma + ad + b)d} \quad (3)$$

where a and b are the parameters determined earlier (a=0.0392, b=0.114) and γ converts standard deviation to the HWHM (γ=1.177). The standard deviation of the size distribution, σ, is normalized to d so that it is unitless and can easily be converted to a percentage of the mean diameter.

Table 3 shows diameters of PbS NCs used in the sizing curve, as determined by both SAXS and TEM.

| abs. peak (nm) | bandgap (eV) | SAXS diameter (nm) | TEM diameter (nm) | TEM dispersity (%) |
|---|---|---|---|---|
| 1796 | 0.69 | 8.2 | 7.7 | 3.5 |
| 1750 | 0.71 | 7.9 | 7.7 | 3.7 |
| 1673 | 0.74 | 7.3 | 7.0 | 3.6 |
| 1581 | 0.78 | 7.3 | 6.9 | 4.0 |
| 1508 | 0.82 | 7.0 | 6.8 | 3.5 |
| 1495 | 0.83 | 7.1 | 6.4 | 3.3 |
| 1445 | 0.86 | 6.3 | — | — |
| 1388 | 0.89 | — | 5.7 | 3.9 |
| 1372 | 0.90 | 5.8 | — | — |
| 1320 | 0.94 | — | 5.8 | 4.2 |
| 1292 | 0.96 | 5.5 | 5.4 | 5.6 |
| 1206 | 1.03 | 4.8 | 5.1 | 4.8 |
| 1122 | 1.11 | 5.0 | 4.6 | 4.7 |
| 1008 | 1.23 | 4.6 | 4.4 | 6.1 |

Sizing Curve:

$$E_g = 0.41 + \frac{1}{0.0392d^2 + 0.114d}$$

$E_g$ has units [eV], d has units [nm]

HWHM Dispersity Relationship:

$$HWHM(d, \sigma) = \frac{(0.00543d\sigma + 0.923d + 1.34)\sigma}{(0.0118\sigma + 1)(0.0392d + 0.114)}$$
$$(0.000461d\sigma + 0.0392d + 0.114)d$$

HWHM has units [meV], d has units [nm], σ has units [%, relative to d]

The sizing curve can predict slightly larger sized NCs for a given band gap value. The deviation is greatest for the smallest diameter dots. This difference can be attributed to discrepancies likely in TEM image processing techniques. Nevertheless, the experimental data presented here fall within the deviation seen among various literature sources.

In addition to showing narrow absorption linewidths, the NCs synthesized here also exhibit bright and narrow infrared emission. In FIG. 13*a*, PL spectra collected from ten different NC sizes are presented. Tunable emission spans the range of 1080-1560 nm, with 1600 nm being the upper limit of the detector used in this study. In FIG. 13*b*, both the absorption and emission spectra for three different sizes of NCs are plotted to show that emission has similarly narrow linewidths as compared to absorption and that Stokes shift is minimal. FIG. 13*c* shows the measured Stokes shift as a function of the peak absorption wavelength, which approach values as low as 11 meV, with preliminary results indicating that Stokes shifts as low as 8 meV are possible.

Photoluminescence Lifetime

The photoluminescence lifetimes of the NCs in thin film and solution were measured using time correlated single photon counting. The PL lifetime measurements are shown in FIG. 14. The solution phase measurements are fit well by a single exponential decay with a lifetime of 1.8 μs, which is in close agreement with the observations of Cademartiri et al. When the same NCs are dropcast into a thin film, with native OA ligands, the PL decay is no longer single exponential. In that film, the 1/e lifetime is approximately 260 ns.

Stability of PbS Nanocrystals

The NCs synthesized using the recipe developed here show air stability after being stored as a dry powder for several months. In FIG. 15, the absorption spectra for three different sizes of NC samples immediately following synthesis and after 3 months of storage in air were compared. The peak positions remain the same with no increase in HWHM. Furthermore, PL QY can be in the range of 30-60% for several months after synthesis and without storage in air free environments. Notably, QY can be 60% for NCs which had been in air for 5 months. This exceptional air stability has been observed in previous studies, and it is believed to be a result of nanocrystal surface passivation by chloride ions. See, for example, Cademartiri, L. et al., *Philos. Trans. A. Math. Phys. Eng. Sci.* 2010, 368, 4229-4248, which is incorporated by reference in its entirety. This property is unique to recipes using $PbCl_2$ as a precursor, as it has been found that only small dots are air stable when synthesized via the Hines & Scholes method. Indeed, the air stability shown here can be attributed to chloride surface passivation, as observed via XPS (see FIG. 16). XRD can be used to ensure the NCs were well purified and there were no traces of crystalline $PbCl_2$. Using XPS, signal from chlorine can be observed, which supports the conclusion that the nanocrystals are passivated by a chloride layer.

Self-Assembly of PbS NCs

A significant benefit of monodisperse NCs is their ability to self-assemble into two or three dimensional ordered structures, which increases packing density and has the potential to improve transport properties in thin films. See, for example, Murray, C. B. et al., *Science* 1995, 270, 1335-1338; Dong, A. et al., *Nature* 2010, 466, 474-477; Shevchenko, E. V. et al., *Semiconductor Nanocrystal Quantum Dots;* 2008; pp. 119-169, each of which is incorporated by reference in its entirety. FIG. 17a and b show TEM micrographs of two and three dimensional ordering. Samples were prepared by drop casting NC suspensions in hexane onto TEM grids. The monolayer in FIG. 17a self-assembles into a hexagonally close packed (HCP) arrangement. Drop casting a more concentrated suspension of NCs yields micron sized superlattices, such as that shown in FIG. 17b. It is estimate that this superlattice is approximately 5 NC layers thick. The high degree of monodispersity also allows for self-assembly of macro scale superlattices. FIG. 17c presents the GISAXS pattern from PbS NCs drop cast from a 50 mg/mL suspension onto a silicon wafer. The sharply defined peaks indicate that this is a single crystal superlattice and the peak locations are consistent with body-centered cubic (BCC) packing Furthermore, the wide angle X-ray scattering shows that the atomic lattices of the nanocrystals are aligned as well. These two observations are consistent with previous findings for PbS NCs which have been handled in air. See, for example, Choi, J. J. et al., *J. Am. Chem. Soc.* 2011, 133, 3131-3138, which is incorporated by reference in its entirety.

FIG. 18 shows wide angle X-ray scattering (WAXS) pattern from NCs dropcast from a toluene solution at 50 mg/mL onto a silicon wafer. The GISAXS pattern for this sample is shown in FIG. 17c of the main text. Scattering from atomic planes (111), (200), and (220) show crystallographic alignment of the individual NCs.

FIG. 19 shows the typical process used for TEM image analysis performed using ImageJ software. A magnification of 200,000× is used for all analyses. The average calculated particle diameter can increase from 50,000× to 100,000× to 200,000× magnification. At the lower magnifications, a single pixel represents ~0.2 and 0.1 nm, respectively. 200,000× was chosen for the analysis here because it provides a combination of accuracy (1 pixel=0.05 nm) and statistics (~100 particles per image). An FFT filter is applied to the original TEM image. The minimum feature size for the FFT filter is set to correspond to 0.75 nm, while the maximum feature size corresponds to 40 nm (although this setting is less critical). The FFT filter has the effect of smoothing the image, so that contrast variations in the amorphous carbon support are less apparent and it is easier to distinguish particles from the background. The threshold tool is then used in ImageJ to turn the grayscale image into a binary one. The default threshold routine in ImageJ sets the cutoff for the image. A particle analysis is then performed, which provides the area, center of mass, and major and minor radii for each particle in the image. In MATLAB, image artifacts which are too small, too large, or too elongated to be NCs, were automatically rejected. Using the area of each particle, a diameter is computed along with the statistics for average diameter and standard deviation of the ensemble. The center and a circle with the calculated diameter on the original image were superimposed as a qualitative check for accuracy.

Although the invention has been described above with respect to a preferred embodiment and various modifications thereof, it is apparent that the forgoing and other changes in form and detail may be made therein by one skilled in the art while still remaining within the spirit and scope of the invention.

What is claimed is:

1. A method of preparing semiconductor nanocrystals, comprising:
   contacting an M-containing precursor with an X donor to form a mixture; and
   heating the mixture in the presence of a coordinating solvent to form nanocrystals,
   wherein the molar ratio between the M containing precursor and the X donor is more than 15.

2. The method of claim 1, wherein M is selected from the group consisting of Cd, Pb, Zn, Mg, Hg, Al, Ga, In, and Tl.

3. The method of claim 1, wherein X is selected from the group consisting of O, S, Se, Te, N, P, As, and Sb.

4. The method of claim 1, wherein M is Pb.

5. The method of claim 1, wherein X is S.

6. The method of claim 1, wherein X is Se.

7. The method of claim 1, wherein the molar ratio between the M containing precursor and the X donor is between 20:1 and 30:1.

8. The method of claim 1, wherein the molar ratio between the M containing precursor and the X donor is between 23:1 and 25:1.

9. The method of claim 1, wherein the molar ratio between the M containing precursor and the X donor is 24:1.

10. The method of claim 1, wherein the formed nanocrystals are monodisperse.

11. The method of claim 1, wherein the dispersity of the nanocrystals is less than 5%.

12. The method of claim 1, wherein the dispersity of the nanocrystals is less than 4%.

13. The method of claim 1, wherein the nanocrystals have a HWHM of less than 30 meV.

14. The method of claim 1, wherein the peak absorption of the nanocrystals is between 1000 nm and 1800 nm.

15. The method of claim 1, further comprising heating the mixture at a temperature of less than 150° C.

16. The method of claim 1, further comprising heating the mixture at a temperature of less than 100° C.

17. The method of claim 1, further comprising heating the mixture at a temperature of less than 50° C.

18. The method of claim 1, wherein the quantum yield of the nanocrystals is more than 30%.

19. The method of claim 1, wherein the quantum yield of the nanocrystals is more than 50%.

20. The method of claim 1, further comprising purifying the nanocrystals.

21. The method of claim 1, further comprising purifying the nanocrystals with an alcohol.

22. The method of claim 1, further comprising purifying the nanocrystals with oleic acid.

23. A method of preparing semiconductor nanocrystals, comprising:
   contacting an M-containing precursor with an X donor to form a mixture, wherein the molar ratio between the M containing precursor and the X donor is more than 4;
   heating the mixture in the presence of a coordinating solvent to form nanocrystals; and
   adding additional X donor to the mixture during the heating.

24. The method of claim 23, wherein the dispersity of the nanocrystals is less than 5%.

25. The method of claim 23, wherein the dispersity of the nanocrystals is less than 4%.

26. The method of claim 23, wherein the additional X donor is added slowly to the mixture.

* * * * *